United States Patent [19]
Suzuki

[11] Patent Number: 5,691,772
[45] Date of Patent: *Nov. 25, 1997

[54] WHITE BALANCE ADJUSTMENT DEVICE

[75] Inventor: Masahiro Suzuki, Kawasaki, Japan

[73] Assignee: Nikon Corporation, Tokyo, Japan

[*] Notice: The term of this patent shall not extend beyond the expiration date of Pat. No. 5,504,525.

[21] Appl. No.: 485,120

[22] Filed: Jun. 7, 1995

Related U.S. Application Data

[63] Continuation of Ser. No. 157,482, Nov. 26, 1993, Pat. No. 5,504,525.

[30] Foreign Application Priority Data

Nov. 25, 1992 [JP] Japan ................................ 4-315357

[51] Int. Cl.$^6$ ........................................................ H04N 9/73
[52] U.S. Cl. ........................ 348/223; 348/226; 348/227
[58] Field of Search .................................. 348/223, 226, 348/227, 655, 657, 555, 663, 669, 225, 228, 224; H04N 9/73

[56] References Cited

U.S. PATENT DOCUMENTS

| | | | |
|---|---|---|---|
| 5,001,552 | 3/1991 | Okino | 348/224 |
| 5,016,094 | 5/1991 | Kaneko | 348/223 |
| 5,504,525 | 4/1996 | Suzuki | 348/223 |

*Primary Examiner*—Michael H. Lee

[57] ABSTRACT

A white balance adjustment device adapted to be used in contexts where a photographic subject is illuminated with fluorescent lighting. The white balance adjustment device includes an imaging device for forming an image of a photographic subject and for outputting signals representing the image. An adjustment mode selection device is included for selecting a white balance adjustment mode according to the kind of light source used to illuminate the photographic subject. A measurement unit is used to measure color aspects of the light source used to illuminate the photographic subject. White balance adjustment circuitry is included to adjust the white balance of the output of the imaging device in accordance with the adjustment mode selected by the adjustment mode selection device and in accordance with the measured color aspects of the light source used to illuminate the subject. A method of performing white balance adjustment includes the steps of imaging a subject to produce a video signal representing an image of the subject, color separating the video signal into its primary light color components, measuring the color attributes of light used to illuminate the subject to produce a color measurement value, matching the color measurement value with a predetermined parameter to produce a processing parameter which corresponds to the type of light used to illuminate the subject, and performing white balance adjustment of the video signal using the processing parameter.

10 Claims, 6 Drawing Sheets

WHITE BALANCE ADJUSTMENT DEVICE

This application is a continuation of application Ser. No. 08/157,482, filed Nov. 26, 1993, now U.S. Pat. No. 5,504,525.

BACKGROUND OF THE INVENTION

1. Field of the Invention

The present invention relates to white balance adjustment devices particularly suitable for television cameras, video cameras, electronic still cameras, and the like.

2. Description of the Related Art

Figure 1:
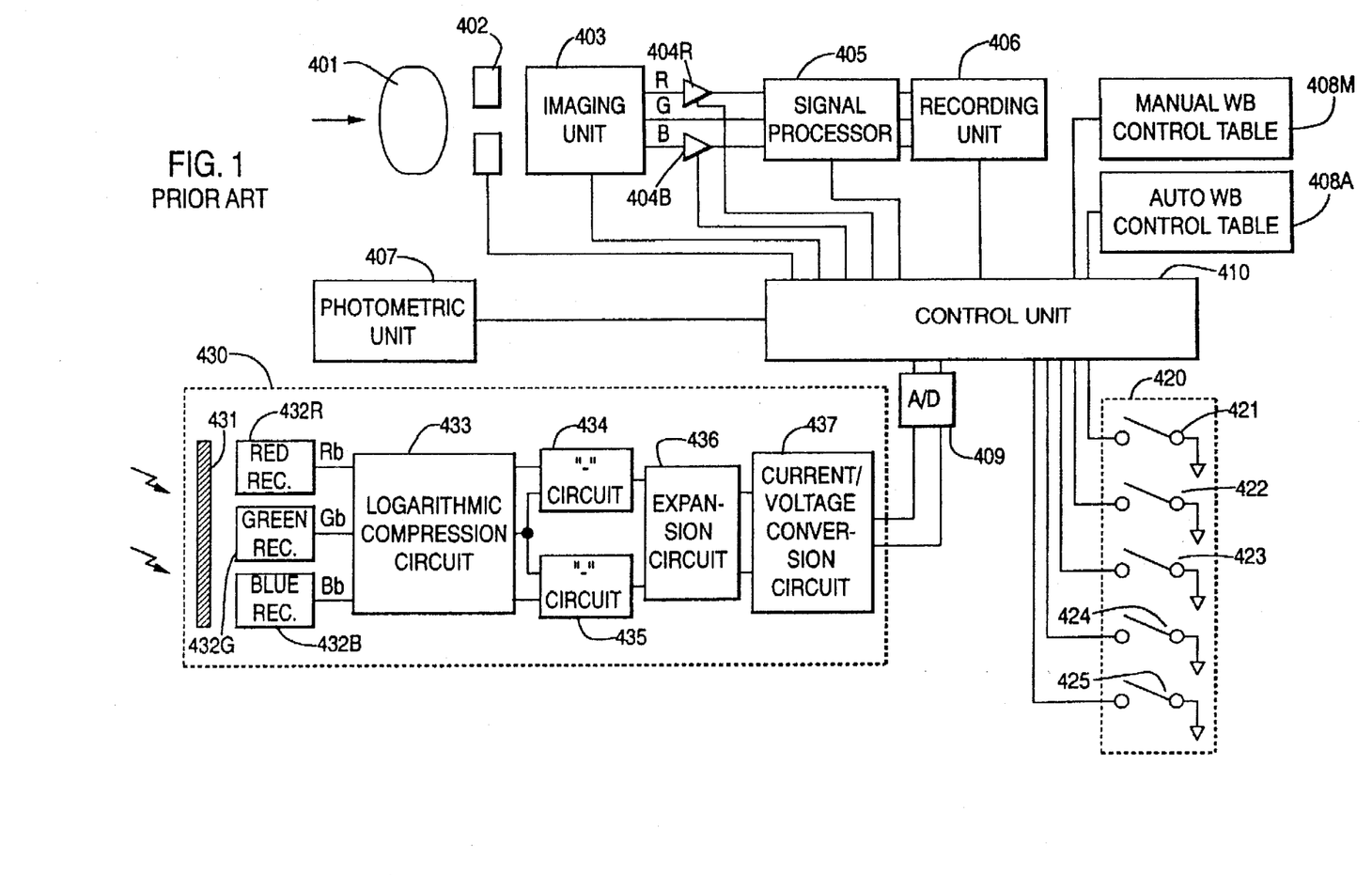
FIG. 1 is a block diagram which depicts a typical prior art white balance adjustment device.

White balance adjustment devices of cameras are well known. FIG. 1, for example, shows a well-known white balance adjustment device which is used in a color camera. Imaging unit 403 is an element which converts light into electrical signals. The imaging unit is typically a charge-coupled (CCD) device, a metal oxide semiconductor (MOS) device, or an other form of solid-state imaging device. A circuit samples the output signals from imaging unit 403 at a predetermined rate. In particular, light rays are received from a photographic subject (not shown) via the optical member 401 and stop member 402. Respective R (red), G (green), and B (blue) signals are output from the imaging unit 403. The G output signals are transmitted directly to a signal processor 405; the R output and the B output are transmitted to the signal processor 405 via respective white balance variable amplifier circuits 404R and 404B controlled by means of a control unit 410 according to the output of a color measurement unit 430. Typically, as the light source varies, the levels of the R and B signals are adjusted, usually so that there is a natural color balance, based on the G signal level. The signal processor 405 performs the adjustment of gain, set-up level, gamma and knee, etc., and transmits image signals to a recording unit 406.

The prior art white balance adjustments which are made by means of variable amplifier circuits 404R and 404B will next be described. Light, received by the color measurement unit 430 from the camera surroundings, is passed through a diffusing plate 431 to a R red light receiving element 432R, to a G green light receiving element 432G, and to a B blue light receiving element 432B, and from the respective light receiving elements there are output signal currents corresponding to the red component (Rb), green component (Gb) and blue component (Bb) of the incident light. After these signal currents have been converted into logRb, logGb and logBb signals by respective logarithmic compression by a logarithmic compression circuit 433, log (Rb/Gb) and log (Bb/Gb) are calculated in subtraction circuits 434 and 435, and are furthermore converted into Rb/Gb, Bb/Gb by antilog conversion in the expansion circuit 436. After conversion into voltage signals by the current/voltage converter circuit 437, they are converted into digital signals by the A/D converter 409 and are output to control unit 410.

In the case that the auto whim balance mode is selected by means of a switch 421, the gain of the variable amplifier circuits 404R and 404B corresponding to the measured color results Rb/Gb, Bb/Gb is "looked up" or retrieved from a previously prepared control table 408A for auto white balance use, and is set in the respective amplifier circuits 404R and 404B.

If the auto white balance mode is not selected via switch 421 and, alternatively, the white balance mode is selected to be in a "fine weather," "cloudy," "fluorescent lamp," or "tungsten lamp" mode via corresponding switches 422–425 (i.e., a manual white balance mode), the gain corresponding to the selected light source of the manual mode is looked up from a previously prepared control table 408M for manual white balance use, and is set in the respective amplifier circuits 404R and 404B.

While prior art white balance adjustment devices of the type discussed above have been in use for some time. In recent years, fluorescent lamps have been developed which emit light resembling the emitted colors of electric light bulbs. Fluorescent lamps may emit light of a white color, a daylight white color, a daylight color, and the like. Such new lighting and illumination sources present problems for prior art white balance adjustment devices. For example, photographic picture coloration is often too red or too blue, depending on the kind of fluorescent lamp which is used as an illumination source. This problem results with prior art white balance adjustment devices since such devices use the same control values and parameters for white balance adjustment regardless of the fluorescent lighting source actually being used to illuminate a subject.

In order to solve the aforementioned problems, selection switches were arranged for electric bulb color, white color, daylight white color, daylight color and the like in the fluorescent lamp manual mode, and the photographer, selecting according to the kind of fluorescent lamp, for example, could make an adjustment for the optimum color balance. However, it is difficult for photographers to determine exactly the kind of fluorescent lamp being used by mere visual inspection during use of a camera, for example.

The present invention solves the aforementioned and numerous other problems associated with white balance adjustment in photographic/video settings.

SUMMARY OF THE INVENTION

It is therefore an object of the present invention to solve the above-mentioned and other problems associated with conventional white balance adjustment devices.

It is therefore another object of the present invention to provide a white balance adjustment device which provides high accuracy white balancing in the contexts of video and photographic processing.

It is another object of the present invention to provide a white balance adjustment device which is capable of operating in a variety of modes corresponding to particular lighting contexts.

It is still another object of the present invention to provide a white balance adjustment device which is capable of accurately determining the type of light source used to illuminate a photographic subject and performing white balancing in accordance with such a determination.

It is yet a further object of the present invention to provide a white balance adjustment device which is particularly cable of determining the type of fluorescent lighting used in fluorescent lighting contexts.

It is still yet another object of the present invention to provide a white balance adjustment device which performs white balance adjustments of video signals in accordance with determinations of the type of lighting used to illuminate a subject.

These and other objects are achieved by the present invention in that a white balance adjustment device adapted for use in fluorescent lighting contexts is defined. The white balance adjustment device includes an imaging unit for forming an image of a subject and for outputting that image. Moreover, the white balance adjustment device includes an adjustment mode selection unit for selecting a white balance adjustment mode according to the kind of light source used to illuminate the subject. Further, the device has a measurement unit for measuring color aspects of the light source used to illuminate the subject and for outputting a color value corresponding to the color aspects. Finally, the device includes a white balance adjustment unit for adjusting the white balance of the output of the imaging unit in accordance with the adjustment mode selected by the adjustment mode selection unit and in accordance with the color value measured by the measurement unit.

The present invention provides a method for performing white balance adjustment based on the kind of light source used to illuminate a subject. The method includes the steps of imaging a subject to produce a video signal representing an image of the subject, color separating the video signal into its primary light color components, measuring the color attributes of light used to illuminate the subject to produce a color measurement value, matching the color measurement value with a predetermined parameter to produce a processing parameter which corresponds to the type of light used to illuminate the subject, and performing white balance adjustment of the video signal using the processing parameter.

The present invention is described in further detail below.

BRIEF DESCRIPTION OF THE DRAWINGS

The above-mentioned and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENTS

A detailed description of the preferred embodiments is set forth below referring to the drawing figures briefly described above. Where appropriate, like parts will be referred to with like reference numerals.

Figure 2:
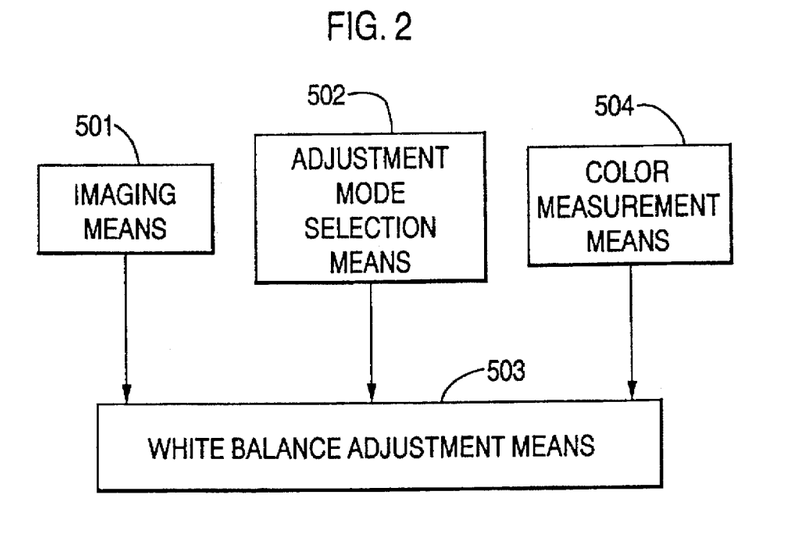
FIG. 2 is a block diagram which depicts the general structure of the present invention.

Referring now to FIG. 2, therein depicted is a blocked diagram of the general structure of the preferred embodiment of the present invention. In particular, a white balance adjustment unit 503 is shown to receive inputs from an imaging unit 501, an adjustment mode selection unit 502, and a color measurement unit 504. Based on the inputs from the aforementioned imaging unit 501, the adjustment mode selection unit 502, and color measurement unit 504, the white balance adjustment unit 503 is able to perform accurate and efficient white balance adjustment.

Figure 3:
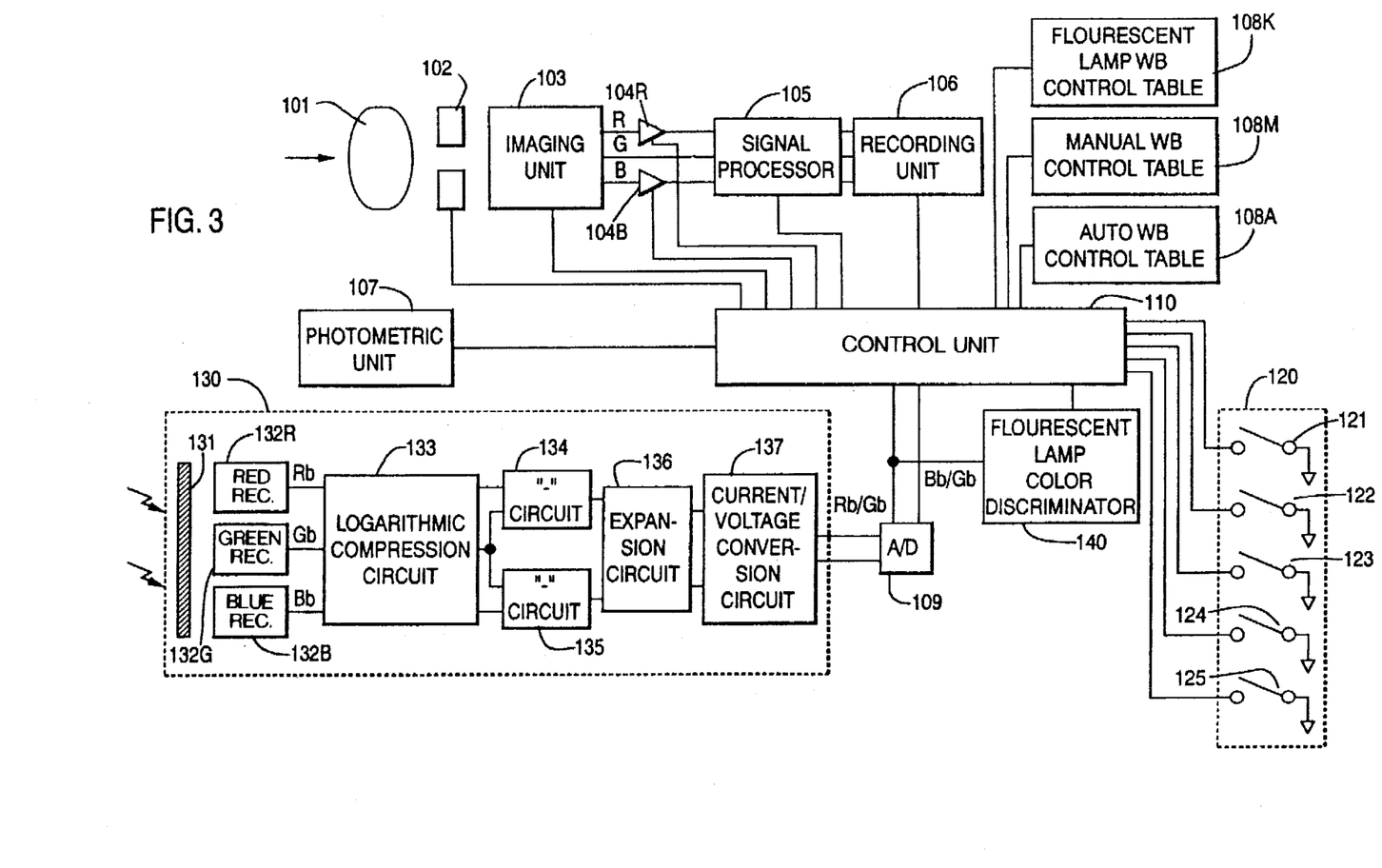
FIG. 3 is a block diagram which depicts a white balance adjustment device according to a first embodiment of the present invention.

Referring now to FIG. 3, therein depicted is a white balance adjustment device according to a first embodiment of the present invention. The white balance adjustment device depicted in FIG. 3 is adapted to be used with a video camera, but should not be so restricted. Imaging unit 103 comprises elements which convert light into electrical signals, and is constituted by circuits for sampling, at a predetermined rate, the output signals from imaging elements such as CCD, MOS devices, and similar solid-state imaging elements. Such imaging elements will be apparent to those skilled in the art. Light rays are received from a photographic subject (not shown) via optical member 101 and stop member 102, and respective R (red), G (green), and B (blue) signals are output. Variable amplifiers 104R and 104B amplify the R and B signals from imaging unit 103 at a gain set by a control unit 110 and output them to a signal processor 105. Control unit 110 may be a microcomputer, microprocessor, custom central processing unit, or other well known dedicated control circuit which can carry out the functionality defined by the present invention. In the case where control unit 110 is a microcomputer, typical support circuitry would include, but would not be limited to, a random access memory (RAM), a read only memory (ROM), and an input/output (I/O) handler, Moreover, the G output of the imaging unit 103 is passed directly to the signal processor 105 without passing through an amplifier circuit. Adjustment of gain, set-up level, gamma and knee, etc., is performed by the signal processor 105, and image signals are output to a recording unit 106.

A color measurement unit 130 receives light from the camera surroundings, and analyzes it into a red component (Rb), a green component (Gb), and a blue component (Bb). Color separation in this manner will be apparent to those skilled in the art. Signal currents are output corresponding to the red component (Rb), green component (Gb) and blue component (Bb) via a diffusing plate 131 on a R light receiving element 132R, a G light receiving element 132G, and a B light receiving element 132B. A logarithmic compression circuit 133 logarithmically compresses the respective signal currents, and outputs log Rb, log Gb and log Bb signals. Subtraction circuits 134 and 135 calculate log (Rb/Gb) and log (Bb/Gb) based on the outputs of the logarithmic compression circuit 133, and an expansion circuit 136 calculates Rb/Gb, Bb/Gb by antilog conversion of the output of the logarithmic compression circuit 133. Moreover, a current/voltage converter circuit 137 converts the Rb/Gb and Bb/Gb signals into voltage signals, and an A/D converter 109 converts the voltage signals into digital signals and outputs them to control circuit 110.

A control table 108A for use in auto white balance is a memory which in auto mode, along with processing the values Rb/Gb and Bb/Gb as parameters, stores the gain of the variable amplifier circuits 104R and 104B. A control table 108M for use in manual white balance is a memory which stores the gain for fine weather, cloudy, and tungsten light sources which is produced when white balance adjustment device is set in a manual mode. A control table 108K for use in fluorescent lamp white balance situations is a memory to store the gains for the kind of fluorescent lamp used in situations wherein fluorescent lamp manual mode is selected.

A photometric unit 107 measures the brightness of the light received from the photographic subject and outputs a corresponding value to control unit 110. Such photometric units will be apparent to those skilled in the art. A fluorescent lamp color discrimination unit 140 discriminates among the different kinds of fluorescent lighting sources, based on the Rb/Gb color measurement result of color measurement unit 130, and looks up the gain of the variable amplifier circuits 104R and 104B corresponding to the kind of fluorescent lamp from the control table 108K for fluorescent lamp white balance use.

The control unit 110 performs sequence control of the camera and various calculation processes. Additionally, control unit 110 performs white balance adjustment for the R, G and B output signals of the imaging unit 103. Furthermore, the white balance adjustment switch 120 is a switch for the selection of the adjustment mode. Switch 121 is a switch which is used to select an auto white balance mode when such an operation is desired from the white balance adjustment device. Switches 122–125 are switches for the selection of the light source in a manual white balance adjustment mode. In particular, switches 122–125 may be used to select among lighting states related to fine weather, cloudy weather, fluorescent lamp/lighting and tungsten lamp/lighting.

Figure 6:
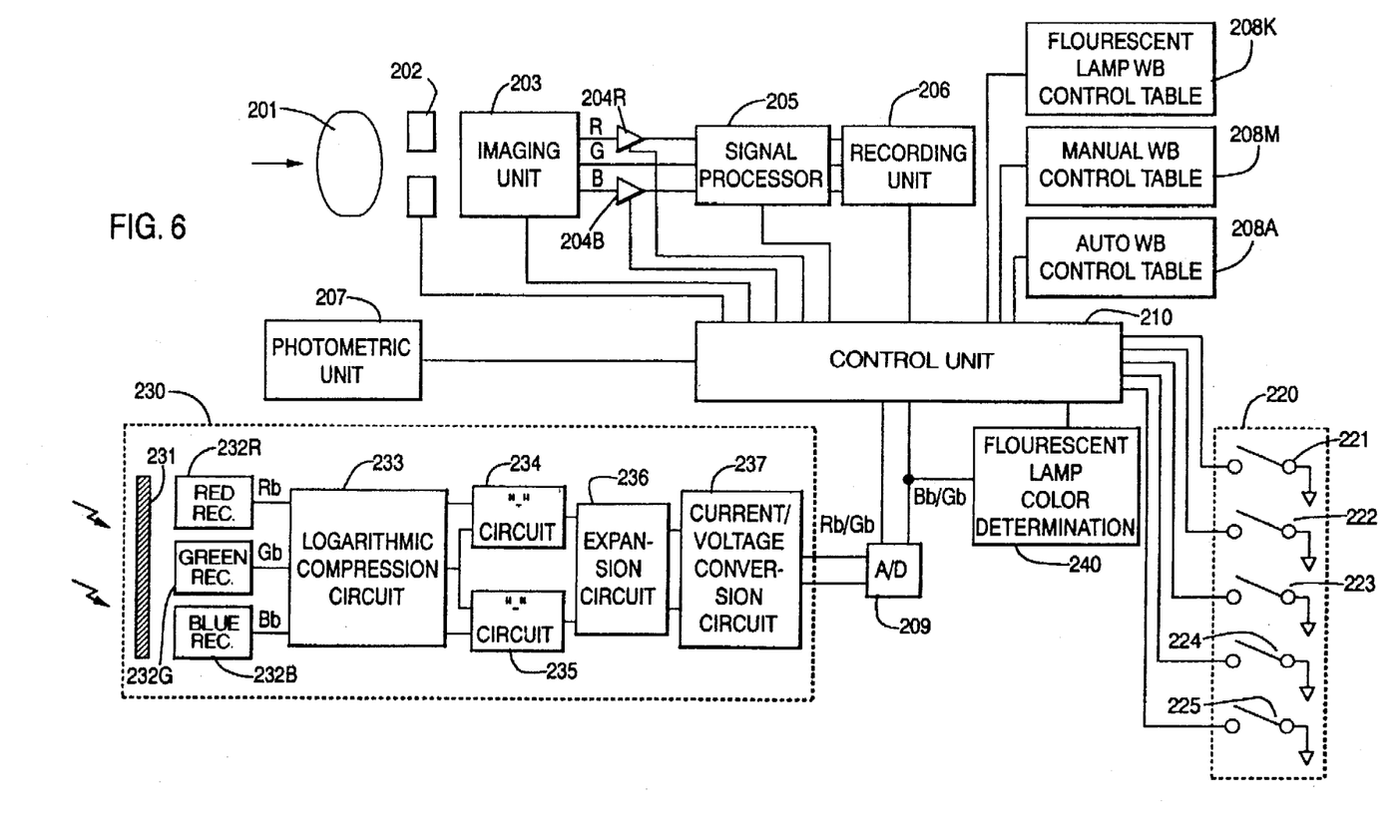
FIG. 6 is a block diagram which depicts a white balance adjustment device according to a second embodiment of the present invention.
Figure 7:
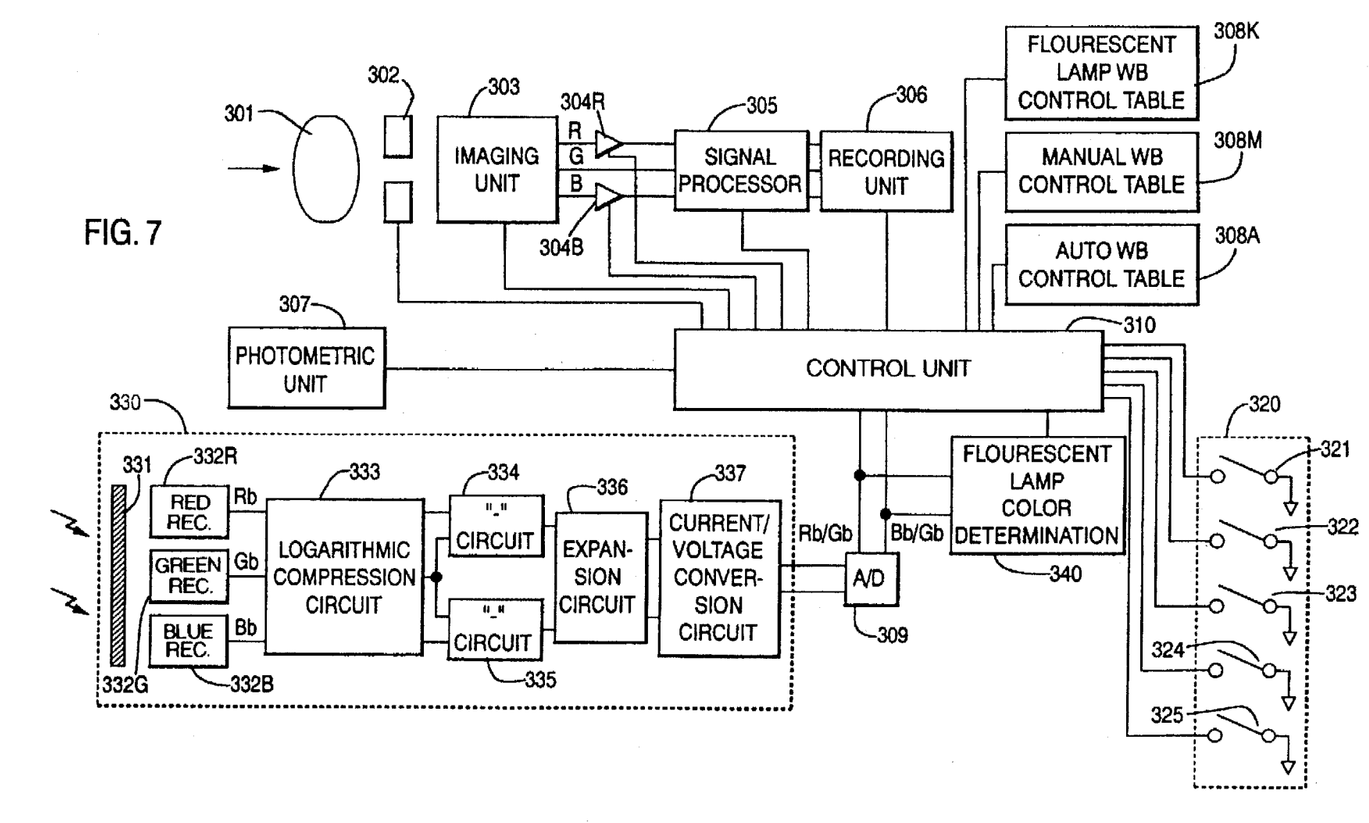
FIG. 7 is a block diagram which depicts a white balance adjustment device according to a third embodiment of the present invention.

Referring generally to FIGS. 3, 6, and 7, the imaging units 103,203, and 303, respectively, constitute an embodiment for an imaging means for forming an image of a subject and outputting the image. The white balance adjustment switches 120, 220, and 320, respectively, constitute an embodiment for an adjustment mode selection means for selecting a white balance adjustment mode according to the kind of light source used to illuminate the subject. Color measurement units 130, 230, and 330, respectively, constitute a color measurement means for measuring the color aspects of the light source used to illuminate the subject and for outputting a color value corresponding to the color aspects. Finally, the control units 110, 210, and 310, the fluorescent lamp discrimination units 140, 240, and 340, and the variable amplifier circuits 104R, 104B; 204R, 204B; and 304R, 304B, respectively, constitute an embodiment for a white balance adjustment means for adjusting the white balance of the output of the imaging means in accordance with the adjustment mode selected by the adjustment mode selection means and in accordance with the color value measured by the color measurement means.

Figure 4:
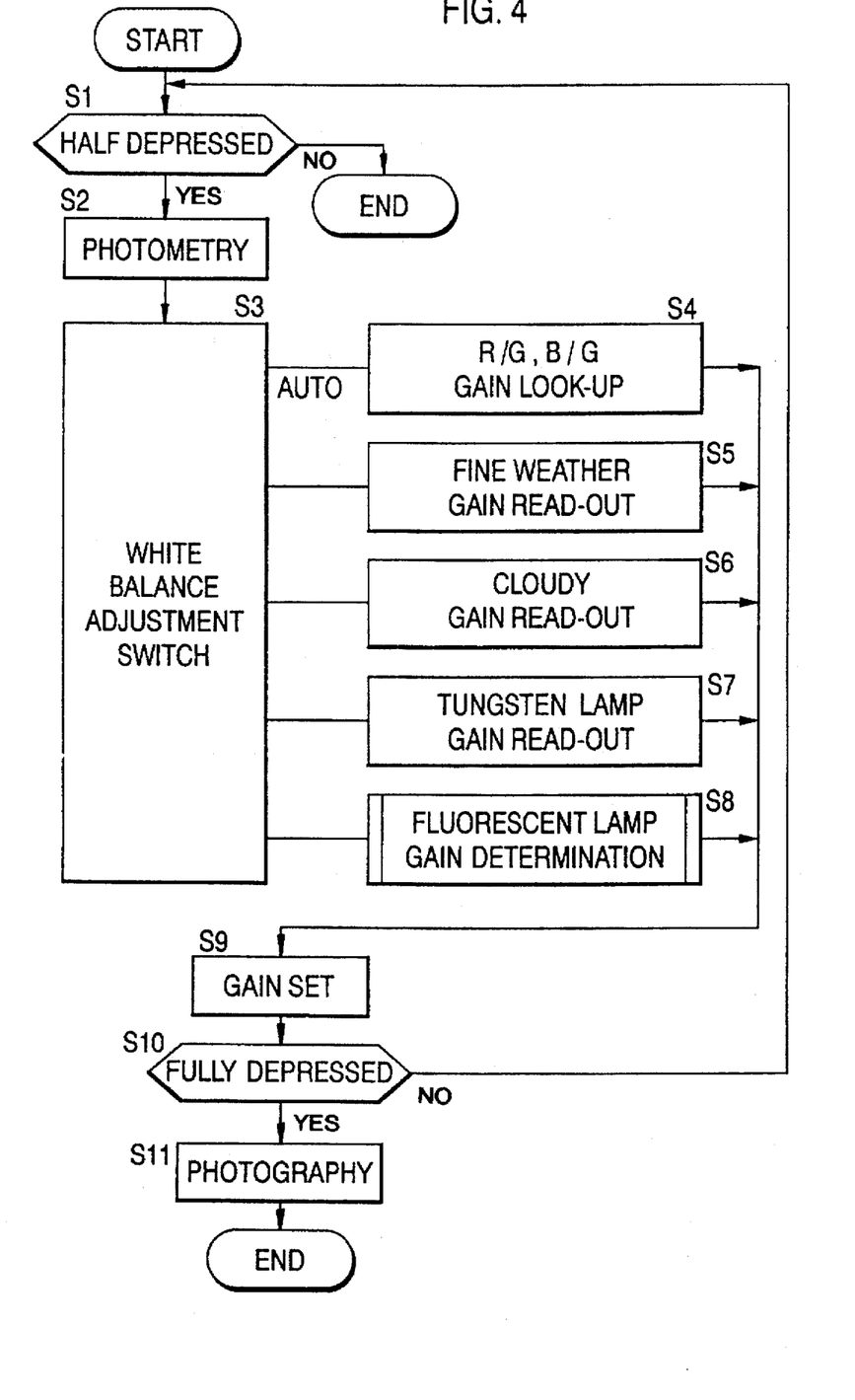
FIG. 4 is a flow chart which depicts a white balance adjustment action which is carried out by a white balance adjustment device according to a preferred embodiment of the present invention.
Figure 5:
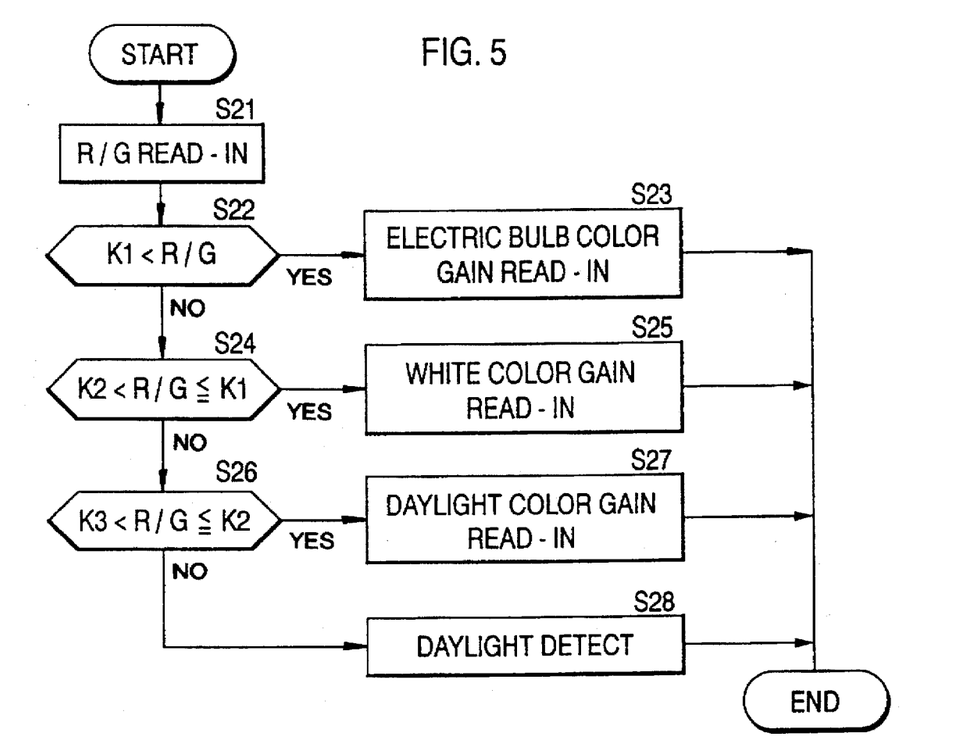
FIG. 5 is a flow chart which depicts the gain setting process in a fluorescent lamp manual mode according to a preferred embodiment of the present invention.

Referring now to FIGS. 4 and 5, therein depicted are flow charts which illustrate the white balance adjustment actions which are carried out by a white balance adjustment device according to an embodiment of the present invention. In particular, the actions illustrated in FIG. 4 are carried out by control unit 110. FIG. 5 depicts a flow chart which illustrates the gain decision process of fluorescent lamp color discrimination circuit 140 in the fluorescent lamp manual mode. The actions of the first preferred embodiment will be described with reference to these flow charts. It should be understood that while the actions depicted in the flow charts are preferably implemented using computer software (e.g., via programs), such actions also may be hard-wired.

First, in step S1 of FIG. 4, it is determined whether or not the photographic button (not shown), has been half depressed; if it has been half depressed, proceeding to step S2, the subject brightness is measured by means of photometric unit 107. Accordingly, the measurement of the brightness level by photometric unit 107, for example, allows the control unit 110, for example, to add the brightness level to the white balance adjustment process in order to gain further accuracy in carrying out white balance adjustments of the video signal. At step S3, according to the adjustment mode selected by the white balance adjustment switch 120, the program branches to one of steps S4–S8. Such branching can be carried out using typical branching structures like that of the C-language "switch" construct. Namely, when the "auto" mode has been selected by means of switch 121, proceeding to step S4, the gain corresponding to the Rb/Gb color measurement result is looked up from the control table 108A for auto white balance use. When "fine weather" of the manual mode has been selected by means of switch 122, proceeding to step S5, the gain corresponding to fine weather is read out from the control table 108M for manual white balance use. Moreover, when "cloudy" of the manual mode has been selected by means of switch 123, proceeding to step S6, the gain corresponding to cloudy weather is read out from the control table 108M for manual white balance use. Furthermore, when "tungsten light" of the manual mode has been selected by means of switch 125, proceeding to step S7, the gain corresponding to tungsten light is read out from the control table 108M for manual white balance use.

When the "fluorescent lamp" manual mode has been selected by means of switch 124, proceeding to step S8, the gain is next decided in the fluorescent lamp manual mode by means of the fluorescent lamp color discrimination unit 140. At step S21 of FIG. 5, the Rb/Gb color measurement result is read out from the color measurement unit 130. At step S22, it is determined whether Rb/Gb is greater than a previously set value K1. If Rb/Gb is greater than K1, the program proceeds to step S23; if not, it proceeds to step S24. In step S23, it is determined that the light source is an electric bulb of the color fluorescent lamp variety, and the gain for electric bulb color is read out from the control table 108K for fluorescent lamp white balance use.

When, at step S22, programmatic flow results in a negative state, it is determined at step S24 whether or not K2 <Rb/Gb ≦K1; if this logic results in an affirmative state, the program proceeds to step S25, and if not, the program proceeds to step S26. In step S25, if it is determined that the light source is a white fluorescent lamp, the gain for white fluorescent lamps is read out from the control table 108K for fluorescent lamp white balance use.

When, at step S24, programmatic flow resulted in a negative state, it is determined at step S26 whether or not K3 <Rb/Gb ≦K2; if this is affirmative, the program proceeds to step S27, and if not, the program proceeds to step S28. At step S27, it is determined that the light source is a daylight white color fluorescent lamp, and the gain for a daylight white color fluorescent lamp is read out from the control table 108K for fluorescent lamp white balance use. Moreover, at step S28, it is determined that the light source is a daylight color fluorescent lamp, and the gain for a daylight color fluorescent lamp is read out from the control table 108K for fluorescent lamp white balance use.

Returning to FIG. 4 at step S9, the gain decided according to the selected adjustment mode is set in the variable gain amplifiers 104R and 104B, and the program proceeds to step S10. During step S10, it is determined whether or not the photographic button has been fully depressed; if the button has been fully depressed, the program proceeds to step S11, and if not, the program returns to step S1. In step S11, the optimum color balance adjustment is performed for the illuminating light source by means of the variable gain amplifier circuits 104R and 104B. Moreover, the above-mentioned processing by means of signal processor 105 has been performed and the output signals are recorded in the recording unit 106.

In the foregoing manner, when the fluorescent lamp light source has been selected in the manual white balance mode, because the amplification gain of the R and B output signals of the imaging unit has been decided based on the Rb/Gb color measurement result, and the white balance adjustment has been performed, the optimum white balance adjustment will be performed with the kind of fluorescent lamp being automatically determined. Even if a photographic subject is illuminated by one of various kinds of fluorescent lamp, photography is possible with a natural white balance.

In the above-mentioned preferred embodiment, the kind of fluorescent lamp/lighting source is determined by fluorescent discrimination unit 140 based on the red component color measurement result Rb/Gb as illustrated in FIG. 5. The particular kind of fluorescent lamp/lighting source may also be determined, as shown in FIG. 6, by the fluorescent lamp color discrimination unit 240 based on the blue component color measurement result Bb/Gb. Moreover, as shown in FIG. 7, the kind of fluorescent lamp may also be determined by the fluorescent lamp color discrimination unit 340 based on the results of both the red component Rb/Gb and the blue component Bb/Gb. In any event, the present preferred embodiments according to the present invention provide for fluorescent ! lamp/lighting source detection selection freedom as proper white balance adjustment will occur despite the fluorescent lighting source. Moreover, it will be apparent to those persons skilled in the art that a device of the type depicted in FIGS. 6 or 7, with the fluorescent lamp discrimination units 240 or 340 eliminated, is similar to the white balance adjustment device depicted in FIG. 3. Accordingly, descriptions of other preferred embodiments of devices depicted by FIGS. 6 and 7 are omitted.

By means of the present invention as described above, when the adjustment mode is selected according to the fluorescent lamp/light source, based on color temperature information of the light illuminating the subject, the white balance of the output of an imaging means is adjusted so that the kind of fluorescent lamp is automatically detected and an optimum adjustment of the white balance is performed. As such, the present invention allows imaging with a natural white balance whatever the kind of fluorescent lamp/light source that is used to illuminate the subject.

The present invention is not limited to the structure or operation of the preferred embodiments described above, and it goes without saying that many modifications and changes may be made to the form, structure and operation without departing from the spirit or principles of the invention, the scope of which is defined in the appended claims and their equivalents.

What is claimed is:

1. A white balance adjustment device comprising:

an imaging unit which forms and outputs an image signal of an illuminated subject;

an adjustment mode selection unit which selects a white balance adjustment mode from a fluorescent type adjustment mode and a nonfluorescent type adjustment mode;

a measurement unit which outputs a color value corresponding to measured color aspects of light received from the illuminated subject;

a fluorescent lamp color discrimination unit which selects a type of fluorescent lamp color from a first and second type of fluorescent lamp color in response to the color value output from the measurement unit when the fluorescent type adjustment mode is selected; and a white balance adjustment unit which adjusts the white balance of the subject image signal in accordance with the adjustment mode selected by said adjustment mode selection unit, the color value output by said measurement unit, and the selected type of fluorescent lamp color.

2. The white balance adjustment device according to claim 1, further comprising:

a fluorescent lamp control table storing first and second values respectively corresponding to said first and second types of fluorescent lamp colors, wherein a value corresponding to the selected type of fluorescent lamp is output from said control table to said white balance adjustment unit to perform white balance adjustment.

3. A method of white balance adjusting a video signal comprising the following steps:

imaging a subject to produce a subject video signal;

measuring color attributes of fluorescent light used to illuminate the subject;

selecting a fluorescent lamp color from first and second fluorescent lamp colors in response to the measured color attributes of said illuminating light; and performing white balance adjustment of the video signal using the selected fluorescent lamp color.

4. A white balance adjustment device which recognizes a kind of fluorescent light source, comprising:

an imaging unit which outputs a video signal corresponding to a subject image;

an adjustment mode selection unit which selects a white balance adjustment mode from a fluorescent adjustment mode and a nonfluorescent adjustment mode;

a light measurement unit which measures color aspects of the subject;

a fluorescent lamp color discrimination unit which selects a fluorescent lamp color from first and second fluorescent lamp colors in response to the measured color aspects when the fluorescent adjustment mode is selected; and a white balance adjustment unit which adjusts white balance characteristics of said video signal in accordance with the selected white balance adjustment mode and the selected fluorescent light color.

5. The white balance adjustment device according to claim 4, further comprising:

a color measurement unit which measures color aspects of ambient light surrounding said subject and outputs a corresponding color value, wherein the white balance adjustment unit adjusts the white balance characteristics of the video signal in accordance with the output color value.

6. A white balance adjustment unit comprising:

an imaging unit which outputs a video signal corresponding to a subject, said video signal having white balance characteristics;

a light measurement unit which measures ambient light about the subject;

a fluorescent lamp color discrimination unit which selects a fluorescent lamp color from first and second fluorescent lamp colors in response to the measured ambient light and outputs a light source value corresponding to the selected lamp color; and a white balance adjustment unit which adjusts the white balance characteristics of said video signal in response to the selected lamp color.

7. The white balance adjustment device according to claim 6, further comprising:

an adjustment mode selector which selects a white balance adjustment mode from a fluorescent adjustment mode and a nonfluorescent adjustment mode;

wherein said white balance adjustment unit further adjusts said white balance characteristics of said video signal in accordance with the selected white balance adjustment mode.

8. A white balance adjustment device which recognizes fluorescent light sources, comprising:

an imaging unit which outputs a formed image of a subject;

an adjustment mode selection unit which selects a white balance adjustment mode from a fluorescent adjustment mode and a nonfluorescent adjustment mode;

a measurement unit which measures color aspects of a light source used to illuminate said subject and which outputs a color value corresponding to said color aspects; and a white balance adjustment unit which adjusts the white balance of the output of said imaging unit in accordance with the white balance adjustment mode selected by said adjustment mode selection unit and the color value measured by said measurement unit.

9. A white balance adjustment device comprising:

an imaging unit which outputs a video signal corresponding to a subject image;

a light measurement unit which measures color aspects of the subject;

a fluorescent lamp color discrimination unit which selects a fluorescent lamp color from first and second fluorescent lamp colors in response to the measured color aspects;

a fluorescent lamp control table which outputs a fluorescent lamp color value in accordance with the selected fluorescent lamp color; and a white balance adjustment unit which adjusts white balance characteristics of said video signal in accordance with the fluorescent lamp color value.

10. The white balance adjustment device according to claim 9, wherein the fluorescent lamp color discrimination unit selects the fluorescent lamp color from said first and second lamp colors and third and fourth colors.

* * * * *